United States Patent [19]

Mohajerani et al.

[11] Patent Number: 5,526,203
[45] Date of Patent: Jun. 11, 1996

[54] HDA AIR BAFFLE

[75] Inventors: Khosrow Mohajerani, Newbury Park; Eldon L. Nelson, Simi Valley, both of Calif.

[73] Assignee: Seagate Technology, Inc., Scotts Valley, Calif.

[21] Appl. No.: 350,711

[22] Filed: Dec. 7, 1994

Related U.S. Application Data

[63] Continuation of Ser. No. 101,369, Aug. 2, 1993, abandoned.

[51] Int. Cl.⁶ ................................................ G11B 33/14
[52] U.S. Cl. ........................................................ 360/97.02
[58] Field of Search ..................... 360/86, 133, 97.01, 360/97.02, 97.03, 97.04, 98.01, 98.02, 98.03, 98.04, 98.06, 98.07, 103, 105, 106; 361/380–384

[56] References Cited

U.S. PATENT DOCUMENTS

| | | | |
|---|---|---|---|
| 4,535,373 | 8/1985 | Schuh | 360/97 |
| 4,635,151 | 1/1987 | Hazebrouck | 360/105 |
| 4,680,656 | 7/1987 | Manzke et al. | 360/98 |
| 4,714,972 | 12/1987 | Biermeier et al. | 360/97 |
| 4,821,130 | 4/1989 | Bernett et al. | 360/78.04 |
| 4,885,652 | 12/1989 | Leonard et al. | 360/133 |
| 4,922,406 | 5/1990 | Schuh | 360/97.03 |
| 4,979,063 | 12/1990 | Ghose et al. | 360/106 |
| 5,029,026 | 7/1991 | Stefansky | 360/97 |
| 5,109,310 | 4/1992 | Ohkjita et al. | 360/106 |
| 5,117,318 | 5/1992 | Immler et al. | 360/105 |
| 5,170,300 | 12/1992 | Stefansky | 360/105 |
| 5,200,945 | 4/1993 | Engler et al. | 369/99 |

*Primary Examiner*—John H. Wolff
*Assistant Examiner*—William J. Klimowicz
*Attorney, Agent, or Firm*—Kinney & Lange

[57] ABSTRACT

A data storage device includes a memory storage disc, a spindle motor, a read head for sensing data stored on the disc, an actuator for supporting the read head with respect to the disc, and an air baffle between the actuator and the disc. The spindle motor rotates the memory storage disc causing air flow adjacent a surface of the disc. The air baffle is positioned between the disc and the actuator to isolate the actuator from the air flow adjacent the surface of the disc.

10 Claims, 2 Drawing Sheets

HDA AIR BAFFLE

This is a continuation of application Ser. No. 08/101,369, filed Aug. 2, 1993, now abandoned.

BACKGROUND OF THE INVENTION

The present invention relates to memory storage discs which rotate adjacent to contamination sources such as mechanical components. In particular, the present invention relates to an air baffle or shield positioned between a rotating memory storage disc and an actuator assembly so that air flow from the disc through the actuator assembly is blocked to prevent contaminants from the actuator assembly from being deposited upon the disc.

Disc drives are commonly used with computers to store data on concentric tracks defined in magnetic coatings formed on magnetic discs. The discs are attached to a rotating spindle which is powered by a spindle motor. Data is written to and read from selected tracks on a disc by a read/write transducer head. A pivotally mounted actuator supports the transducer head and moves the transducer head across the disc when the head is reading from or writing to the disc. The pivotally mounted actuator is located in an area adjacent the magnetic disc and pivots upon an actuator bearing. The actuator includes a magnetic pole piece and an actuator coil or solenoid. Upon supply of current to the actuator coil, the flux coupling between the actuator coil and the magnetic pole piece results in movement of the transducer head across the disc in response to the applied current to the actuator coil. As a result, the head accesses data stored on the disc.

The actuator further includes a latch which supports the actuator and the transducer head in place when the disc is not being accessed by the head. Typically, a casting surrounds the magnetic disc, the spindle, and the actuator area.

As a spindle rotates the magnetic disc at a high speed varying between 3600 to 5400 rpm, air movement adjacent a surface of the magnetic disc is accelerated to create a disc "wind". The air movement or wind flows into the area of the disc drive containing the actuator. At the same time, air is drawn from the actuator area.

SUMMARY OF THE INVENTION

It has been discovered that loose particles from the magnetic pole piece, the actuator coil, the latch and the casting are carried into the disc area and onto the memory storage disc by the air flow. The same air movement also flows across the top of the actuator to cause suction through the actuator bearing. Consequently, grease vapor particles are also carried by this air movement onto the disc surface. These contaminants cause damage to the transducer and may cause the transducer head to "crash".

The improved data storage device of the present invention includes a memory storage disc, a spindle motor, a read head for sensing data stored on the disc, an actuator for supporting the read head with respect to the disc, and an air baffle between the actuator and the disc. The spindle motor rotates the memory storage disc causing air flow adjacent a surface of the disc. The air baffle is positioned between the disc and the actuator to isolate the actuator from the air flow adjacent the surface of the disc.

DETAILED DESCRIPTION OF THE PREFERRED EMBODIMENTS

Figure 1:
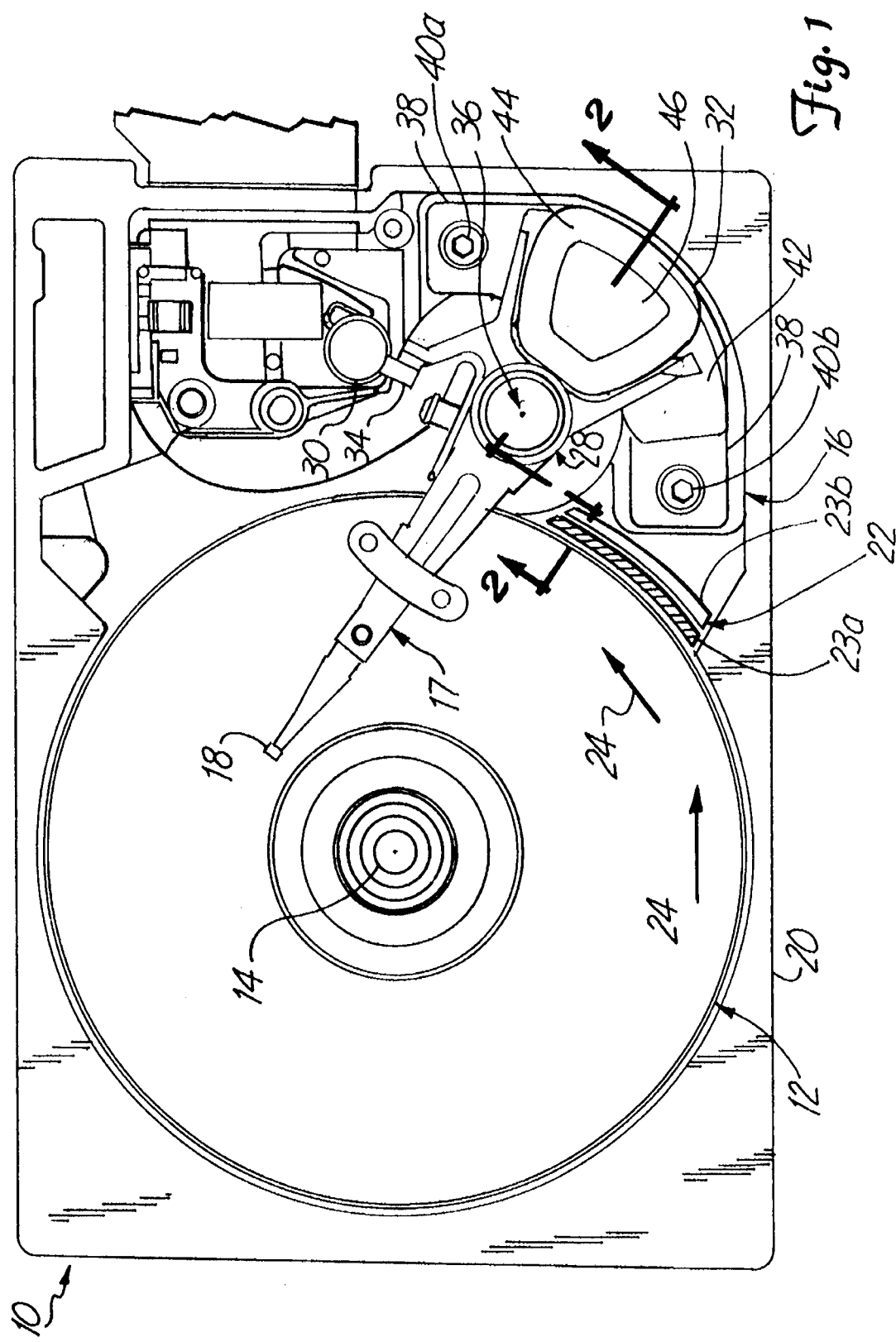
FIG. 1 is a top view of a disc drive assembly of the present invention.

FIG. 1 shows a top view of disc drive 10 with portions removed or not shown for clarity. Disc drive 10 includes memory storage discs 12, spindle motor 14, actuator 16, arm 17, 18, housing 20 and shield or air baffle 22. Memory storage discs 12 are supported within housing 20. Memory storage discs 12 store data and information. Preferably, memory storage discs 12 comprise magnetic discs as are conventionally used in head disc assemblies. However, disc drive 10 may utilize other types of discs, for example, optical discs, and other read/write technologies, for example, lasers.

Spindle motor 14 is conventionally known in the art and is concentrically mounted to memory storage discs 12 within housing 20. Spindle motor 14 rotatable drives memory storage discs 12. Rotation of memory storage discs 12 causes air movement adjacent a surface of each memory storage disc to be accelerated and to create a disc "wind". As shown by arrows 24, the air movement or wind flows in a direction tangential to the rotation of memory storage discs 12.

Actuator 16 preferably is a rotary actuator. Alternatively, actuator 16 may consist of a linear actuator. Actuator 16 is located within housing 20 along the periphery of memory storage discs 12. Actuator 16 is also well-known in the art and includes actuator bearing 28, latch 30, voice coil assembly 32 and outer diameter crash stop 34.

Actuator bearing 28 is positioned within housing 20 between actuator arm 17 and voice coil assembly 32. Actuator bearing 28 pivotally supports actuator arm 17 and transducer 18 about axis 36.

Voice coil assembly 32 is conventionally known in the art and is coupled to actuator arm 17 and actuator bearing 28. Voice coil assembly 32 includes pole plates 38, support posts 40a, 40b, permanent magnets 42, bobbin or voice coil 44 and center pole 46. Pole plates 38 preferably consist of two arcuately curved metal plates. Pole plates 38 are spaced apart to form a gap and are mounted to housing 20 by support posts 40a, 40b. Permanent magnets 42 comprise two arcuately curved magnetic members. Permanent magnets 42 are coupled to an inside surface of pole plates 38 within the gap between pole plates 38. Pole plates 38 and support posts 40a, 40b provide returns for magnetic fields emanating from permanent magnets 42.

Coil 44 is conventionally known in the art. Coil 44 consists of conducting wires wrapped around center pole 46. Coil 44 and center pole 46 are positioned between permanent magnets 42. Upon supply of electrical current to coil 44, under appropriate control as is known in the art, the flux coupling created between the permanent magnets 42 and coil 44 moves coil 44 and center pole 46 transversely to pole plates 38 and permanent magnets 42. As a result, actuator arm 17 and transducer 18, which are coupled to coil 44 and center pole 46, move about axis 36 in an arcuate path to position head 18 with respect to memory storage discs 12.

Latch 30 comprises a magnetic latch. Magnetic latches are well known in the art. Magnetic latches typically hold or latch the arms and heads of a disc drive in place with the holding force of a permanent magnetic when discs are not being accessed. To delatch arm 17 so that discs 12 can be accessed by head 18, electric current is applied to a reverse coil or bucking coil which acts as an electro magnet to apply a reverse flux. The reverse flux weakens the holding force of the permanent magnet to delatch arm 17. Alternatively, latch 30 comprises a solenoid latch. Solenoid latches are also well known in the art. Solenoid latches hold or latch arm 17 in position with an electronically actuated field. As is well-known in the art, latch 30 is actuated to hold actuator arm 17 in place when disc drive 10 is not in use or when discs 12 are not being rotated. Magnetic and solenoid actuated latches have proven to be more reliable than air actuated latches.

Outer diameter crash stop 34 generally comprises an O-ring fitted on a support post. Crash stop 34 is positioned within housing 20 between latch 30 and actuator arm 17. When actuator arm 17 places head 18 at the outside diameter of discs 12, a portion of actuator arm 17 contacts outside diameter crash stop 34. Outer diameter crash stop 34 limits the pivoting movement of actuator arm 17 so that head 18 travels to an outside diameter of memory storage discs 12.

Actuator arm 17 is mounted to actuator bearing 28 and rotates about axis 36. Actuator arm 17 extends from actuator bearing 28 over memory storage discs 12. Actuator arm 17 carries head 18 over and between memory storage discs 12. Rotation of actuator arm 17 about axis 36 causes head 18 to be moved in an arcuate path over memory storage discs 12.

Head 18 is mounted at an end of actuator arm 17. Head 18 preferably comprises a transducer as is conventionally known in the art. Upon rotation of discs 12, head 18 flies above a surface of one of discs 12. Head 18 senses data stored on one of memory storage discs 12.

Housing 20 surrounds and encloses memory storage discs 12, spindle motor 14, actuator 16, arm 17, head 18 and air baffle 22. Housing 20 is typically made from aluminum and is formed in a casting process. Housing 20 protects discs 12 from damage and contaminants outside of housing 20.

Air baffle 22 is a generally elongate, thin wall preferably formed by at least two overlapping members (shields 23a, 23b). Shields 23a, 23b are preferably formed from aluminum. Alternatively, shields 23a, 23b are formed from plastic. Shields 23a, 23b are preferably slightly arcuate so as to match and run parallel with an outer perimeter of discs 12. Alternatively, shields 23a, 23b may be straight. Each of shields 23a, 23b preferably has a thickness of between about 40 mm to about 60 mm. Shields 23a, 23b are preferably formed integrally with housing 20. Alternatively, shields 23a, 23b are mounted to housing 20. Shields 23a, 23b of baffle 22 have a length as large as the movement of actuator arm 17 and the size of other internal components of disc drive 10 will permit. Preferably, shields 23a, 23b are positioned at a maximum distance of about 150 to about 200 mm away from the junction between arm 17 and actuator bearing 28. Shields 23a, 23b of baffle 22 are positioned between discs 12, housing 20, and actuator bearing 28 and voice coil assembly 32 of actuator 16. Shield 23a is positioned along an outer perimeter of discs 12. Shield 23a is positioned as close as possible to discs 12, preferably at a distance of between about 40 mm to about 100 mm. Shield 23b is positioned between shield 23a and actuator bearing 28, pole plates 38, support post 40b, and permanent magnet 42 of actuator 16. Shield 23b is positioned, as close as possible to shield 23a. Shield 23b is preferably parallel with shield 23a. Shields 23a and 23b are preferably separated by a maximum distance of between about 45 to about 50 mm. Shields 23a and 23b preferably overlap one another by at least about 150 mm to about 200 mm. Because shields 23a and 23b overlap one another and because shields 23a and 23b are positioned extremely close to one another, shields 23a and 23b cooperate to form a barrier between disc 12 and actuator 16. As a result, air flow or air movement represented by arrows 24 is prevented from flowing into the area of disc drive 10 containing actuator 16. The area of housing 20 containing actuator 16 is isolated from disc wind adjacent memory storage disc 12.

Furthermore, because air baffle 22 is formed from two separate, but overlapping shields 23a, 23b, air baffle 22 is formed without the typical high tolerance concerns associated with the manufacture of disc drives. Because air baffle 22 is made from two overlapping halves, air baffle 22 does not require a gap between air baffle 22 and either top casing 58 or bottom casing 60 to account for tolerances. As a result, air baffle 22 more completely isolates the area of housing 20 containing actuator 16 from the disc wind adjacent memory storage discs 12. Air baffle 22 and disc drive 10 are also more easily manufactured.

Air baffle 22 interrupts or blocks air flow adjacent the surface of discs 12 and prevents the air flow from entering the area within housing 20 which contains actuator 16. Because air baffle 22 isolates actuator 16 from the air flow adjacent the surface of discs 12, the air flow is prevented from coming into contact with actuator 16. As a result, air baffle 22 prevents loose particles from pole pieces 38, permanent magnet 42, coil 44, latch 30, or housing 20 from being carried into the area of housing 20 containing discs 12 and onto discs 12 by the air flow. In addition, air baffle 22 prevents air movement across actuator bearing 28. Consequently, air baffle 22 prevents grease vapor particles from being carried by the air movement onto the surface of discs 12. By reducing or eliminating potential contaminants from being deposited upon discs 12, air baffle 22 prevents damage to head 18 caused by contaminants on discs 12.

In addition to preventing damage to head 18, air baffle 22 also reduces idle power consumption of spindle motor 14. As the accelerated air movement adjacent the surface of each memory storage disc flows into the area of the disc drive containing actuator 16, new air must be drawn to the surface of each disk to replace displaced accelerated air. Because the new air which is drawn adjacent to the surface of disc 12 has a lower velocity than the displaced accelerated air, spindle motor 14 must accelerate the replacement air. Accelerating the replacement air and drawing the replacement air from other areas of the disc drive increases power consumption of spindle motor 14. Because air baffle 22 prevents accelerated air from flowing into the area of housing 20 containing actuator 16, replacement air at a lower velocity is not drawn from other areas of disc drive 10. Spindle motor 14 does not need to reaccelerate air drawn in at a lower velocity. Thus, air baffle 22 reduces the idle power consumption of spindle motor 14.

Figure 2:
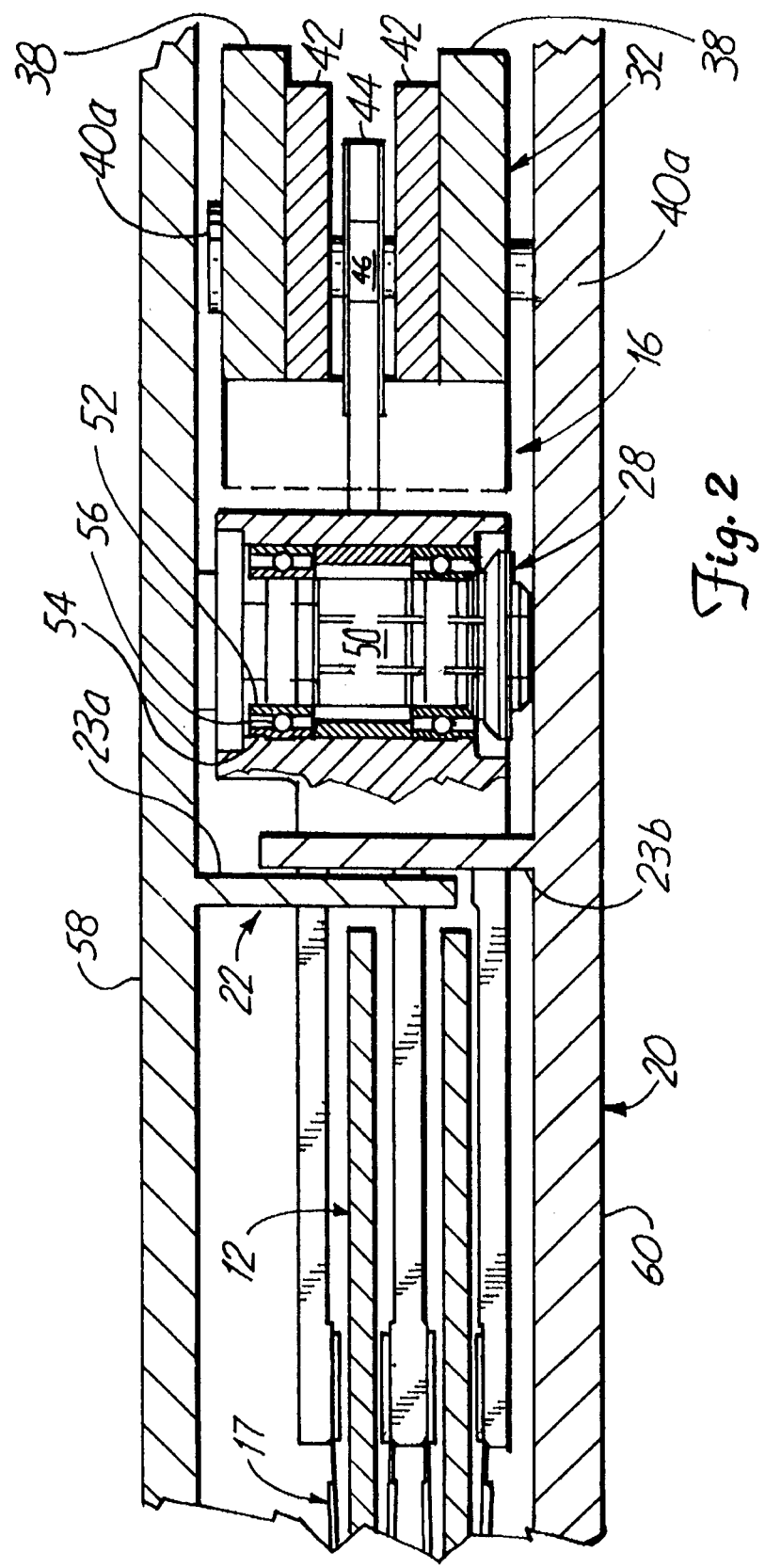
FIG. 2 is a cross-sectional view of the disc drive assembly of FIG. 1.

FIG. 2 shows a cross-sectional view of disc drive 10 taken along lines 2—2 of FIG. 1. FIG. 2 shows actuator 16, housing 20 and air baffle 22 in greater detail. As best shown by FIG. 2, actuator bearing 28 includes actuator post 50, inner race 52, outer race 54 and bearing balls 56. Actuator post 50 is coupled to housing 20. Actuator post 50 supports actuator bearing 28 within housing 20. Inner races 52 are coupled to actuator post 50 and encircle actuator post 50. Outer races 54 are coupled to actuator arm 17 and encircle actuator post 50. Inner races 52 and outer races 54 cooperate with one another to rotatably support an annular array of bearing balls 56. Bearing balls 56 rotatably support actuator arm 17, head 18 (not shown), and voice coil assembly 32 within housing 20 about actuator post 50.

As best shown by FIG. 2, housing 20 includes top casing 58 and bottom casing 60. Top casing 58 extends above actuator 16, arm 17 and discs 12. Bottom casing 60 extends below actuator 16, arm 17 and discs 12. Top casing 58 and bottom casing 60 cooperate to enclose actuator 16, arm 17 and discs 12.

Air baffle 22 includes top shield 23a and bottom shield 23b. Top shield 23a is integrally formed as part of top casing 58. Top shield 23a extends downward from top casing 58 between memory storage discs 12 and actuator bearing 28 of actuator 16.

Bottom shield 23b is integrally formed as part of bottom casing 60. Bottom shield 23b integrally extends upward from bottom casing 60 between memory storage discs 12 and actuator bearing 28 of actuator 16. Bottom shield 23b has an end which extends upward past top shield 23a. Downward extending top shield 23a and upward extending bottom shield 23b vertically overlap one another so that air flow between memory storage discs 12 and actuator 16 is interrupted or blocked. Consequently, the area of housing 20 containing actuator 16 is isolated from disc wind adjacent memory storage discs 12.

As can be appreciated, air baffle 22 may be formed from a variety of materials and may have a variety of shapes, while still isolating actuator 16 from air flow adjacent the disc surface. For example, air baffle 22 may consist of shields oriented sideways so as to horizontally overlap one another. Air baffle 22 may also consist of a single solid or hollow shield.

Although the present invention has been described with reference to preferred embodiments, workers skilled in the art will recognize that changes may be made in form and detail without departing from the spirit and scope of the invention.

What is claimed is:

1. A data storage device comprising:

a memory storage disc;

a spindle motor for rotating the memory storage disc, whereby rotation of the disc causes air flow adjacent a surface of the disc;

data sensing means for sensing data stored on the disc;

an actuator assembly for supporting and positioning the data sensing means with respect to the disc, the actuator assembly including an actuator bearing;

a bottom casing below the actuator assembly and the memory storage disc, the bottom casing including a first vertical shield; and a top casing extending above the actuator assembly and the memory storage disc, the top casing including a second vertical shield, wherein the top casing is mounted to the bottom casing so that the second vehicle shield overlaps the first vertical shield between the actuator bearing and the disc to isolate the actuator bearing from the air flow adjacent the surface of the disc to prevent grease vapor particles from being carried by the air flow onto the surface of the disc.

2. A data storage device comprising:

a memory storage disc;

a spindle motor for rotating the memory storage disc, whereby rotation of the disc causes air flow adjacent a surface of the disc;

data sensing means for sensing data stored on the disc;

positioning means for supporting and positioning the data sensing means with respect to the disc;

a bottom casing below the positioning means and the disc, the bottom casing including a bottom shield extending upward from the bottom casing between the positioning means and the disc; and a top casing above the positioning means and the disc, the top casing including a top shield extending downward from the top casing between the positioning means and the disc, wherein the top casing and the bottom casing are separated by an interior distance, wherein the top and bottom shields each extend a distance less than the interior distance, and wherein the top casing is mounted to the bottom casing so that the top shield and the bottom shield overlap to isolate the positioning means from the air flow adjacent the surface of the disc.

3. The device of claim 2 wherein the data sensing means comprises a head.

4. The device of claim 2 wherein the positioning means comprise an actuator positioned near the disc.

5. The device of claim 4 wherein the actuator includes a magnetic latch for supporting and positioning the data sensing means.

6. The device of claim 4 wherein the actuator includes a solenoid latch for supporting and positioning the data sensing means.

7. A disc drive assembly comprising:

a memory storage disc for storing data;

a spindle motor for rotating the memory storage disc, whereby rotation of the memory storage disc causes accelerated air flow adjacent a disc surface toward the periphery of the disc;

a transducer for sensing data stored on the disc;

an actuator positioned along the periphery of the disc for positioning the transducer with respect to the disc surface;

a bottom casing below the actuator and the disc, the bottom casing defining a first member extending upward from the bottom casing between the disc and actuator; and a top casing above the actuator and the disc, the top casing defining a second member extending downward from the top casing between the disc and the actuator, wherein the top casing and the bottom casing are separated by an interior distance, wherein the first and second members each extend a distance less than the interior distance, and wherein the top casing is mounted to the bottom casing so that the first member and the second member overlap so that accelerated air flow from the disc surface into the actuator is blocked.

8. The disc drive assembly of claim 7 wherein the actuator includes a magnetic latch for supporting and positioning the transducer when the disc is not being rotated.

9. The disc drive assembly of claim 7 wherein the actuator includes a solenoid latch for supporting and positioning the transducer when the disc is not being rotated.

10. In a disc drive assembly including a memory storage disc, a spindle motor for rotating the memory storage disc, whereby rotation of the disc causes air flow adjacent a surface of the disc a transducer for sensing data stored on the disc, an actuator assembly for supporting and positioning the transducer with respect to the disc, and first and second housing sections which substantially enclose the actuator assembly and the memory storage disc, an improvement comprising:

a first baffle extending from the first housing section; and a second baffle extending from the second housing section, wherein the first and second baffles overlap between the actuator assembly and the memory storage disc and wherein the first and second housing sections interrupt the air flow adjacent the disc into the actuator assembly.

* * * * *

UNITED STATES PATENT AND TRADEMARK OFFICE
CERTIFICATE OF CORRECTION

PATENT NO. : 5,526,203
DATED : JUNE 11, 1996
INVENTOR(S) : KHOSROW MOHAJERANI, ELDON L. NELSON

It is certified that error appears in the above-indentified patent and that said Letters Patent is hereby corrected as shown below:

Col. 5, line 49, after "second", delete "vehicle", insert --vertical--

Signed and Sealed this

Twenty-second Day of October, 1996

Attest:

BRUCE LEHMAN

Attesting Officer

Commissioner of Patents and Trademarks